United States Patent
Yamamoto

(10) Patent No.: US 10,495,487 B2
(45) Date of Patent: Dec. 3, 2019

(54) STATOR OF RESOLVER AND THE RESOLVER

(71) Applicant: JAPAN AVIATION ELECTRONICS INDUSTRY, LIMITED, Tokyo (JP)

(72) Inventor: Hirotsugu Yamamoto, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 721 days.

(21) Appl. No.: 14/760,768

(22) PCT Filed: Oct. 30, 2013

(86) PCT No.: PCT/JP2013/079426
§ 371 (c)(1),
(2) Date: Jul. 14, 2015

(87) PCT Pub. No.: WO2014/119066
PCT Pub. Date: Aug. 7, 2014

(65) Prior Publication Data
US 2015/0345997 A1     Dec. 3, 2015

(30) Foreign Application Priority Data
Jan. 31, 2013  (JP) .................................. 2013-016714

(51) Int. Cl.
*G01D 5/20* (2006.01)
*H02K 24/00* (2006.01)

(52) U.S. Cl.
CPC .................................. *G01D 5/2073* (2013.01)

(58) Field of Classification Search
CPC .............................. G01D 5/2073; G01D 5/20
See application file for complete search history.

(56) References Cited

U.S. PATENT DOCUMENTS

| 5,562,466 A * | 10/1996 | Kato ................. H01R 35/025 439/15 |
| 2004/0119350 A1* | 6/2004 | Miya ................. H02K 3/522 310/71 |

(Continued)

FOREIGN PATENT DOCUMENTS

| JP | 2003-209946 | 7/2003 |
| JP | 2004-120873 | 4/2004 |

OTHER PUBLICATIONS

International Search Report, dated Nov. 26, 2013.

*Primary Examiner* — Akm Zakaria
(74) *Attorney, Agent, or Firm* — Greenblum & Bernstein, P.L.C.

(57) ABSTRACT

A stator of a resolver has an annular core having teeth, an insulator that covers a part of the core, windings wound around the teeth with the insulator interposed therebetween, and a cover that covers the windings and connecting wires that are extensions of the windings. The insulator has winding parts, a connecting wire part, a barrier wall and a plurality of island parts, and a positioning projection part is formed on the island parts. The cover is formed by cover sections arranged along the circumference thereof, each of the cover sections has a protrusion part that is to be welded and fixed to one of the island parts. Each of the cover sections is positioned with a positioning recess of the protrusion part being fitted onto the positioning projection part and a side wall thereof being interposed between the barrier wall and the positioning projection part.

17 Claims, 16 Drawing Sheets

(56) References Cited

U.S. PATENT DOCUMENTS

| | | | |
|---|---|---|---|
| 2005/0280320 A1* | 12/2005 | Utsumi | G01D 5/2046 310/43 |
| 2008/0169714 A1* | 7/2008 | Kataoka | G01D 5/20 310/71 |
| 2010/0225185 A1* | 9/2010 | Oohashi | H02K 15/095 310/71 |
| 2011/0193433 A1* | 8/2011 | Bohrer | H02K 3/522 310/71 |
| 2013/0200742 A1* | 8/2013 | Seki | H02K 3/28 310/195 |

* cited by examiner

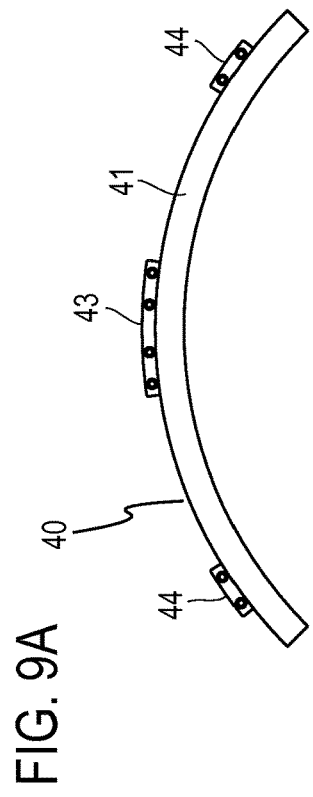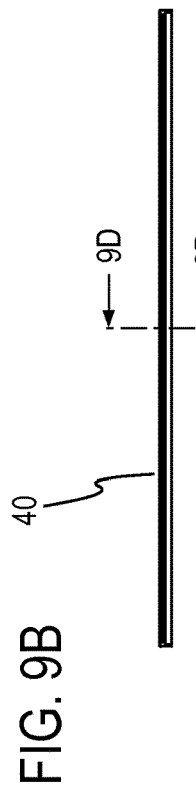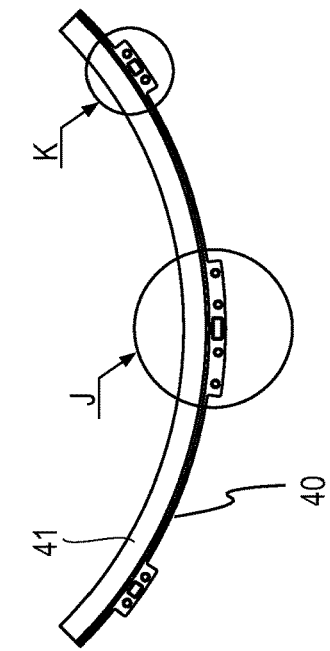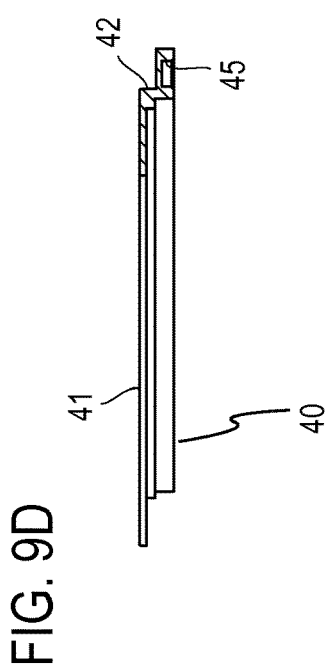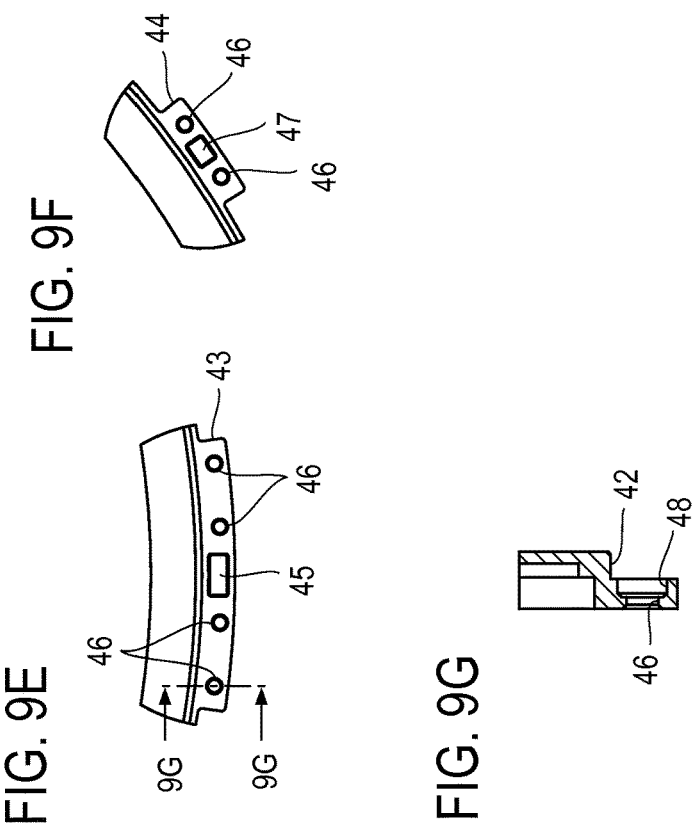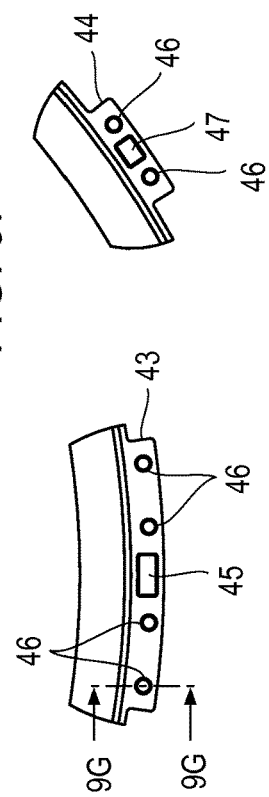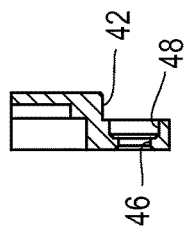

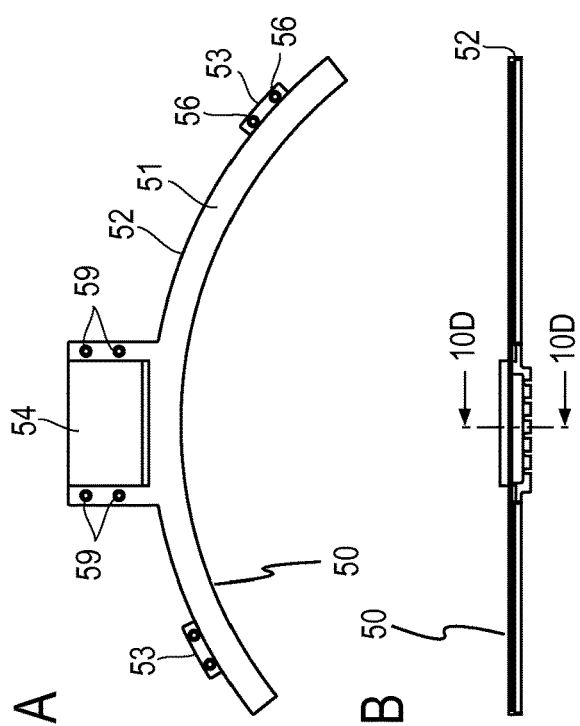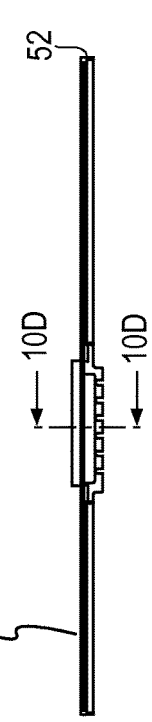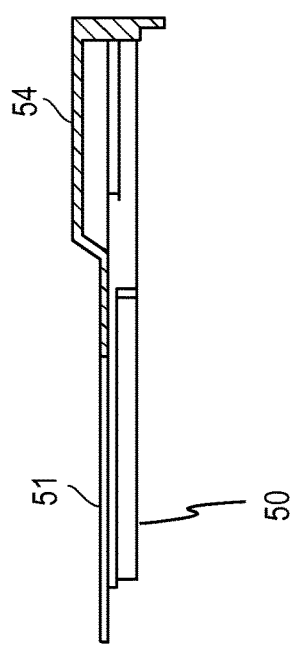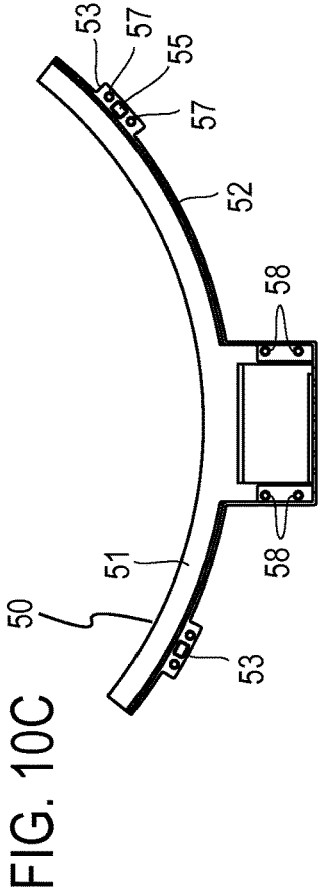

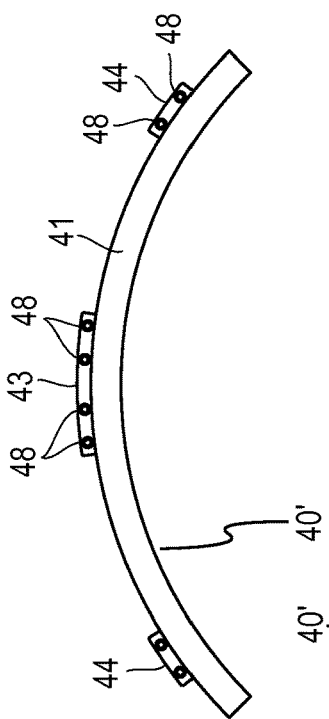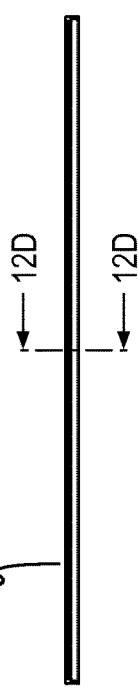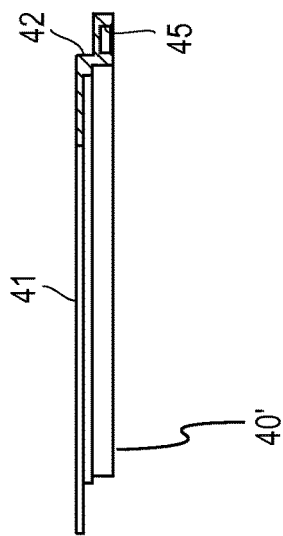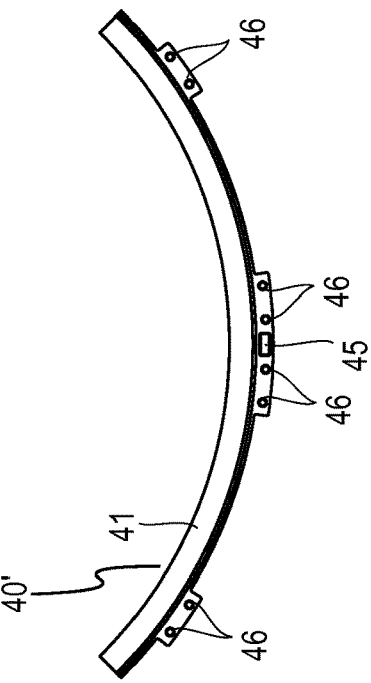
FIG. 12D
FIG. 12A
FIG. 12B
FIG. 12C

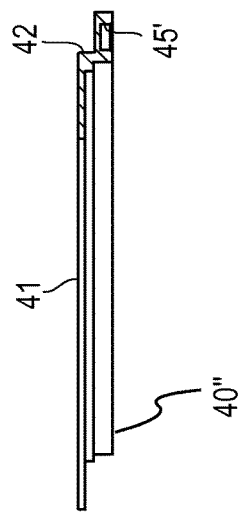
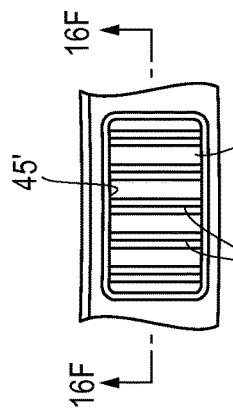
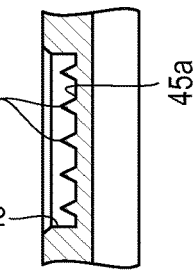
FIG. 16D  FIG. 16E  FIG. 16F
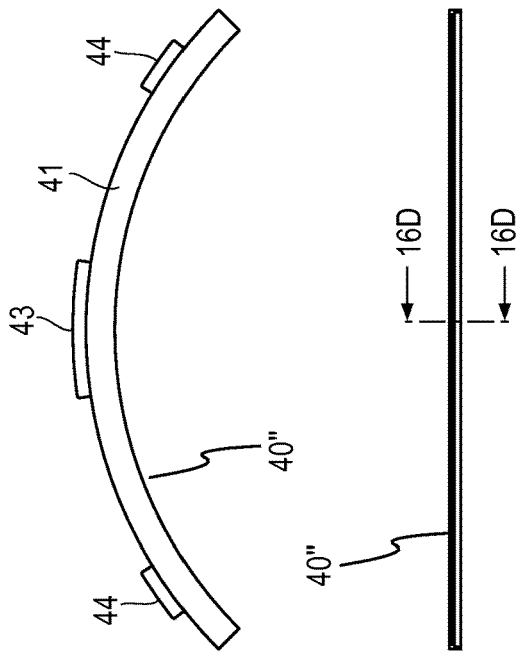
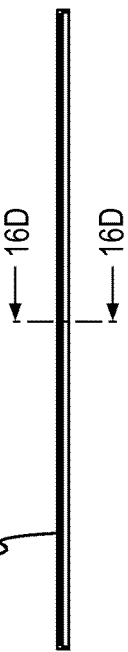
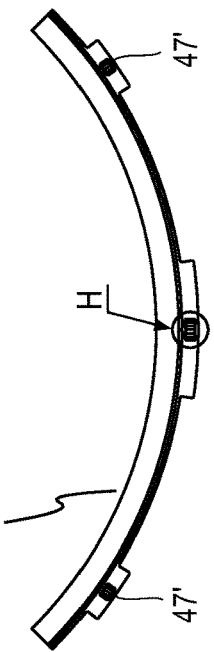
FIG. 16A  FIG. 16B  FIG. 16C

STATOR OF RESOLVER AND THE RESOLVER

TECHNICAL FIELD

The present invention relates to a resolver that detects a rotational angle. In particular, it relates to a structure of a stator that has a cover that protects a winding part and a connecting wire part of the resolver.

BACKGROUND ART

FIG. 1 shows an example of a configuration of a conventional stator of a resolver provided with such a cover of this type disclosed in Patent literature 1. In FIG. 1, reference numeral 1 denotes a ring-shaped stator body, a plurality of magnetic poles 2 is formed to protrude inwardly from the ring-shaped stator body 1, and a stator winding 5 is wound around the plurality of magnetic poles 2 with first and second ring-shaped insulating plates 3 and 4 interposed therebetween. First and second ring-shaped winding covers 7 and 8 are attached to the ring-shaped stator body 1 on the opposite sides by potting of resin 6 or adhesion and cover the stator winding 5.

PRIOR ART LITERATURE

Patent Literature

Patent literature 1: Japanese Patent Application Laid-Open No. 2003-209946

SUMMARY OF THE INVENTION

Problems to be Solved by the Invention

Resolvers are used in various types of servo mechanisms. Recently, in applications such as hybrid vehicles, larger resolvers than conventional having an outer diameter of around 250 mm have been required.

If the stator of such a large resolver is provided with a cover, the cover is also large (has a large diameter). However, the cover generally needs to be thin, and it has been difficult to form a single-piece thin cover of a large diameter in terms of productivity and performance.

More specifically, the cover is typically made of resin, and it is not easy to manufacture, with a satisfactory yield, such a cover of a large diameter that has sufficient flatness and little warping and irregularities. Attachment of a cover having warping and irregularities causes a reaction force (internal stress) in the stator and therefore has an adverse effect in terms of performance, strength and lifetime.

An object of the present invention is to provide a stator with high productivity and performance that has a cover that can be manufactured with high precision and satisfactory yield even when the stator is of a large resolver and can be easily attached to the stator.

Means to Solve the Problems

According to a first aspect of the present invention, there is provided a stator of a resolver, comprising: a core having an annular shape and a plurality of teeth protruded from an inner circumferential surface or an outer circumferential surface of the core along a circumference thereof; an insulator that has an annular shape and covers a part of the core; windings wound around the teeth with the insulator interposed therebetween; and a cover that covers the windings and connecting wires that are extensions of the windings, wherein the insulator comprises winding parts around each of which the windings are wound, a connecting wire part having an annular shape and on which the connecting wires are disposed, a barrier wall provided on a side of the connecting wire part opposite to the winding parts, a plurality of island parts formed along a circumference thereof on a side of the barrier wall opposite to the connecting wire part, and a positioning projection part being formed on each of the island parts, the cover is formed by a plurality of cover sections arranged along a circumference thereof, each of the cover sections has a protrusion part that corresponds to one of the island parts, and the protrusion part is welded and fixed to the one of the island parts, and each of the cover sections is positioned with a positioning recess formed in the protrusion part being fitted onto the positioning projection part and a side wall thereof being interposed between the barrier wall and the positioning projection part.

According to a second aspect of the present invention, there is provided a stator of a resolver, comprising: a core having an annular shape and a plurality of teeth protruded from an inner circumferential surface or an outer circumferential surface of the core along a circumference thereof; an insulator that has an annular shape and covers a part of the core; windings wound around the teeth with the insulator interposed therebetween; and a cover that covers the windings and connecting wires that are extensions of the windings, wherein the insulator comprises winding parts around each of which the windings are wound, a connecting wire part having an annular shape and on which the connecting wires are disposed, a plurality of island parts formed along a circumference thereof on a side of the connecting wire part opposite to the winding parts, and a connecting boss being formed on the connecting wire part at a position corresponding to each of the winding parts, the cover is formed by a plurality of cover sections arranged along a circumference thereof, each of the cover sections has a protrusion part that corresponds to one of the island parts, and the protrusion part is welded and fixed to the one of the island parts, and a part of each of the cover sections located over the connecting wire part is in contact with a tip end surface of the connecting boss.

Effects of the Invention

According to the present invention, the cover is divided into sections. That is, the cover for the windings and the connecting wires is formed by a plurality of cover sections. Therefore, even if the stator has a large diameter, a cover with high flatness can be manufactured with high precision and satisfactory yield, and the problem does not arise that attachment of the cover causes in the stator an internal stress that has an adverse effect in terms of performance, strength, lifetime and the like.

If the cover is divided into sections, another problem would otherwise arise that the cover sections are unstable and fall down during welding and fixing. However, the present invention can prevent such falling down and allows easy and satisfactory welding and fixing.

In the respects, the present invention can provide a stator of a large diameter provided with a cover that has high productivity and performance.

BRIEF DESCRIPTION OF THE DRAWINGS

FIG. 9A is a plan view of a first cover section of the stator shown in FIG. 2;

FIG. 9B is a front view of the first cover section shown in FIG. 9A;

FIG. 9C is a bottom view of the first cover section shown in FIG. 9A;

FIG. 9D is an enlarged cross-sectional view taken along the line 9D in FIG. 9B;

FIG. 9E is a partial enlarged view of a part J in FIG. 9C;

FIG. 9F is a partial enlarged view of a part K in FIG. 9C;

FIG. 9G is an enlarged cross-sectional view taken along the line 9G in FIG. 9E;

FIG. 10A is a plan view of a second cover section of the stator shown in FIG. 2;

FIG. 10B is a front view of the second cover section shown in FIG. 10A;

FIG. 10C is a bottom view of the second cover section shown in FIG. 10A;

FIG. 10D is an enlarged cross-sectional view taken along the line 10D in FIG. 10B;

FIG. 12A is a plan view of a cover section of a stator according to a second embodiment of the present invention;

FIG. 12B is a front view of the cover section shown in FIG. 12A;

FIG. 12C is a bottom view of the cover section shown in FIG. 12A;

FIG. 12D is an enlarged cross-sectional view taken along the line 12D in FIG. 12B;

FIG. 16A is a plan view of a cover section of a stator according to a fourth embodiment of the present invention;

FIG. 16B is a front view of the cover section shown in FIG. 16A;

FIG. 16C is a bottom view of the cover section shown in FIG. 16A;

FIG. 16D is an enlarged cross-sectional view taken along the line 16D in FIG. 16B;

FIG. 16E is a partial enlarged view of a part H in FIG. 16C;

FIG. 16F is a cross-sectional view taken along the line 16F in FIG. 16E; and

DETAILED DESCRIPTION OF THE EMBODIMENTS

In the following, embodiments of the present invention will be described.

Figure 1:
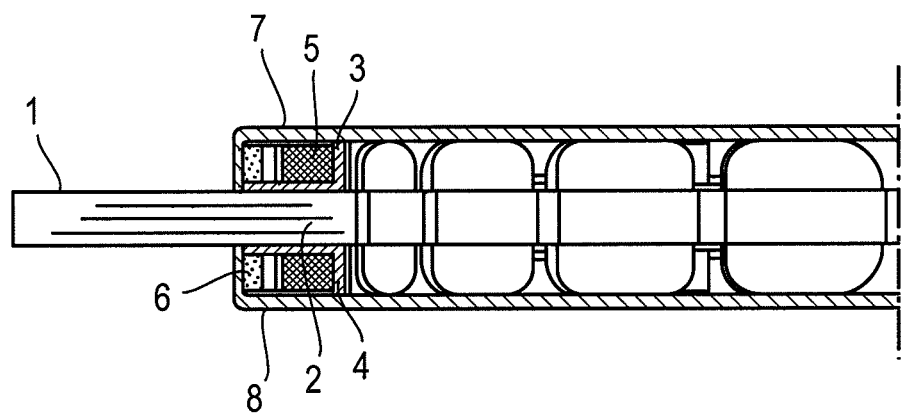
FIG. 1 is a cross-sectional view showing an example of a configuration of a conventional stator.
Figure 2:
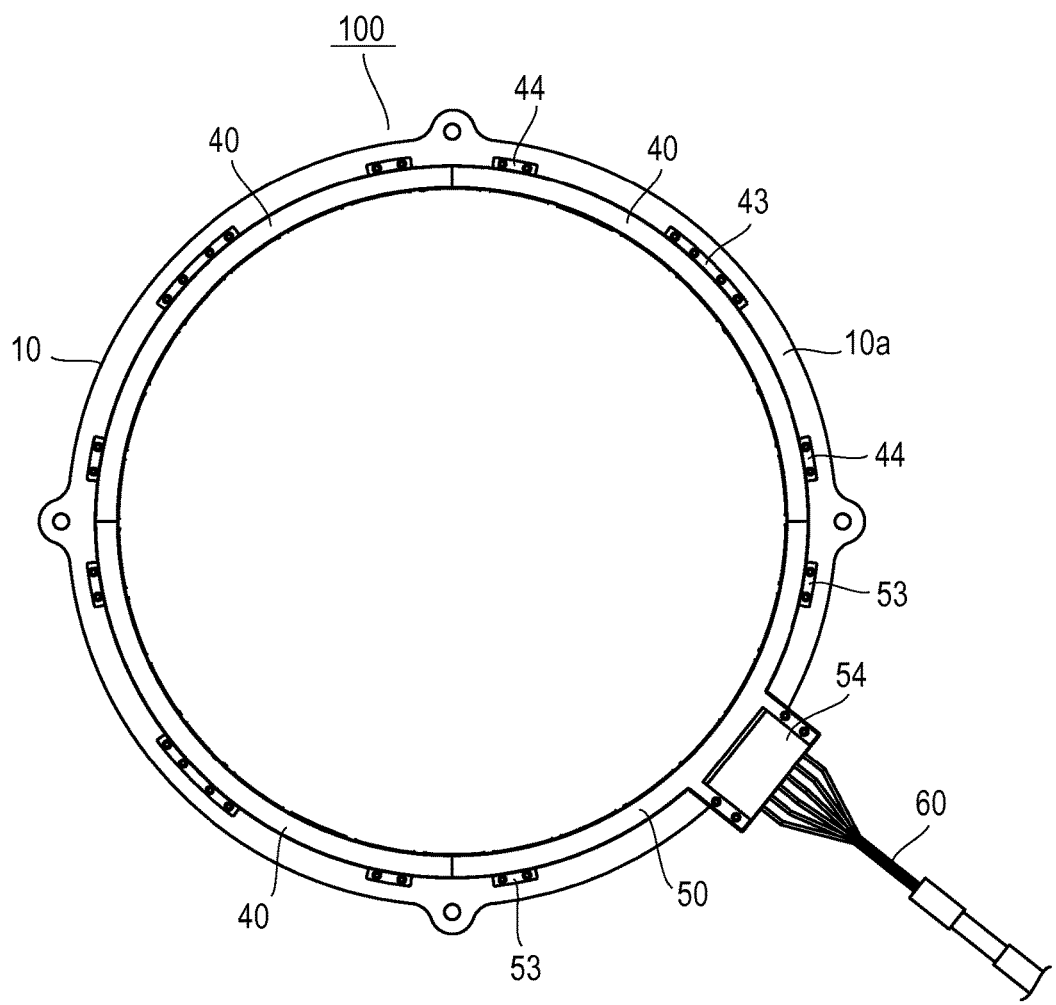
FIG. 2 is a plan view of a stator according to a first embodiment of the present invention.
Figure 3:
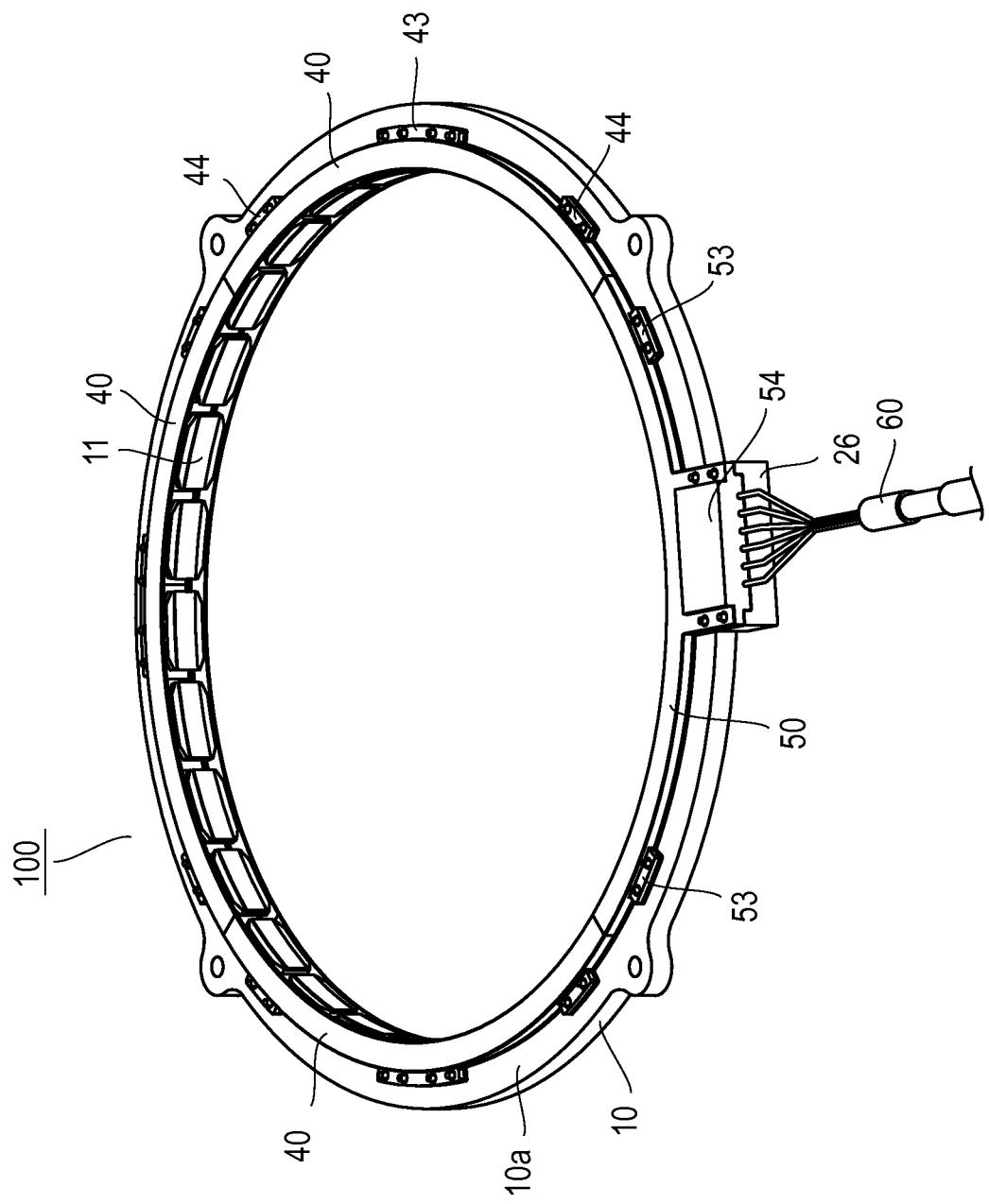
FIG. 3 is a perspective view of the stator shown in FIG. 2 viewed from above the stator.
Figure 4:
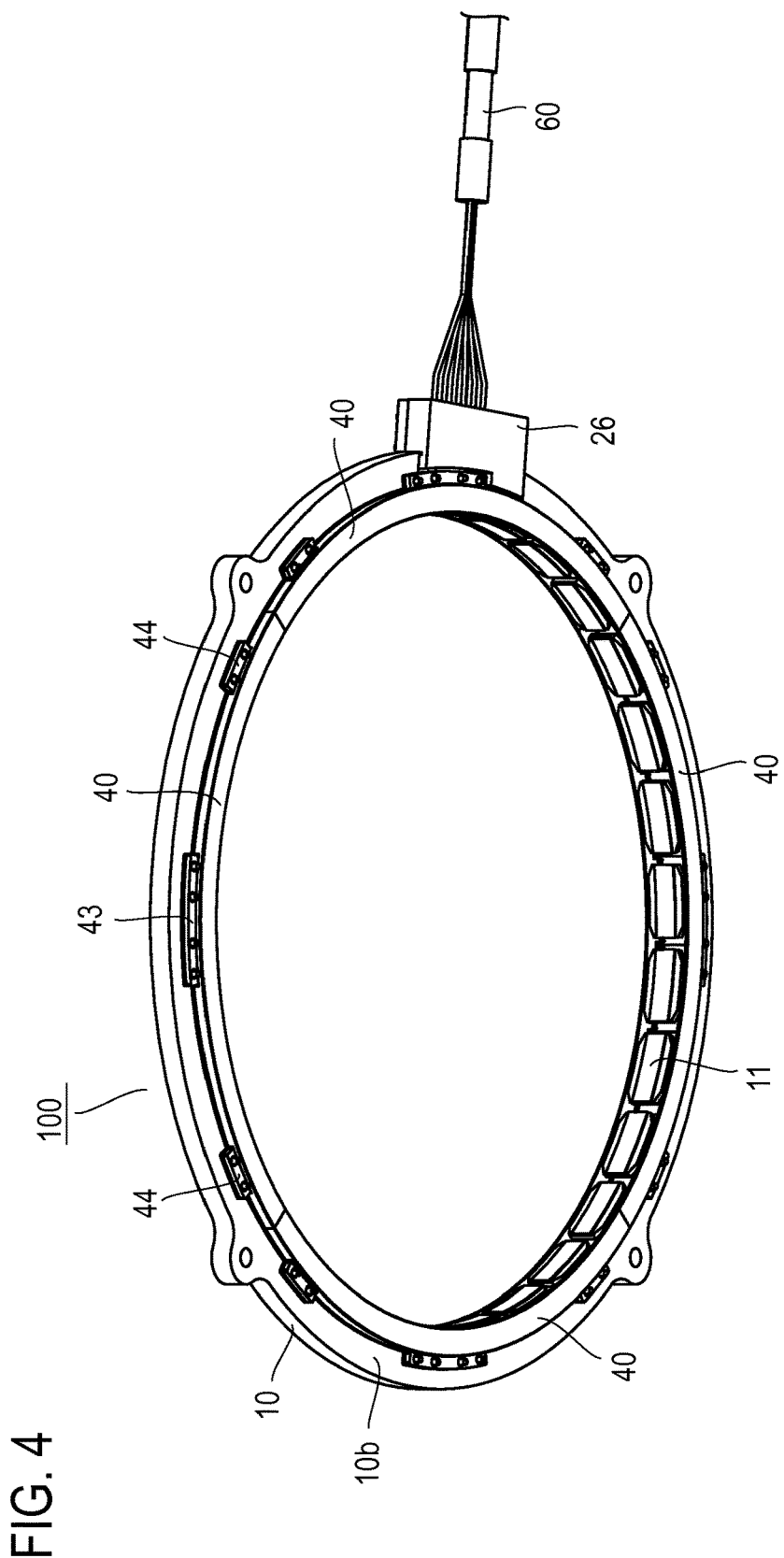
FIG. 4 is a perspective view of the stator shown in FIG. 2 viewed from below the stator.
Figure 5A:
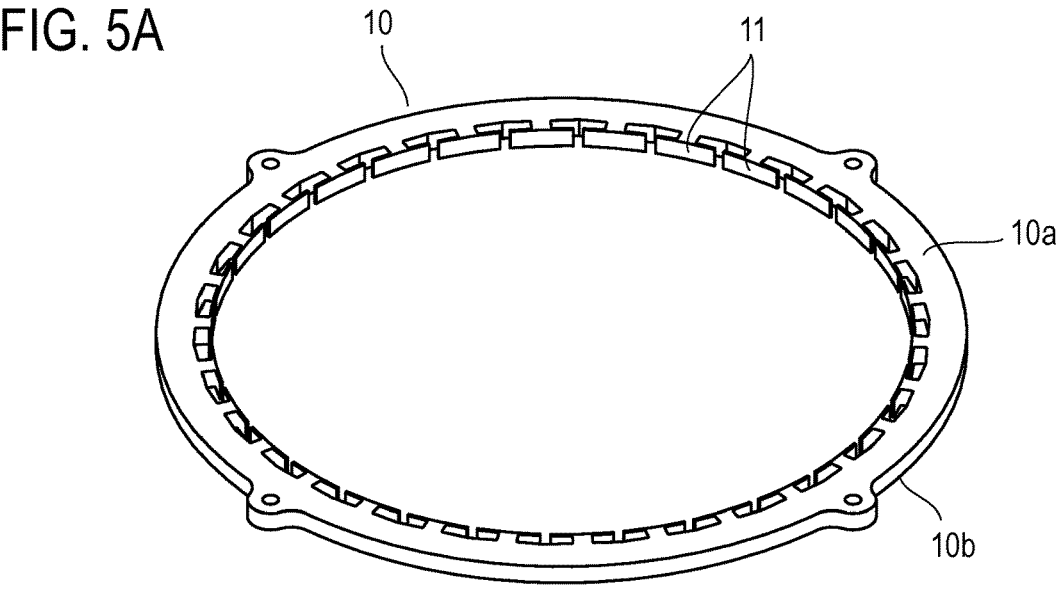
FIG. 5A is a perspective view of a core of the stator shown in FIG. 2.
Figure 5B:
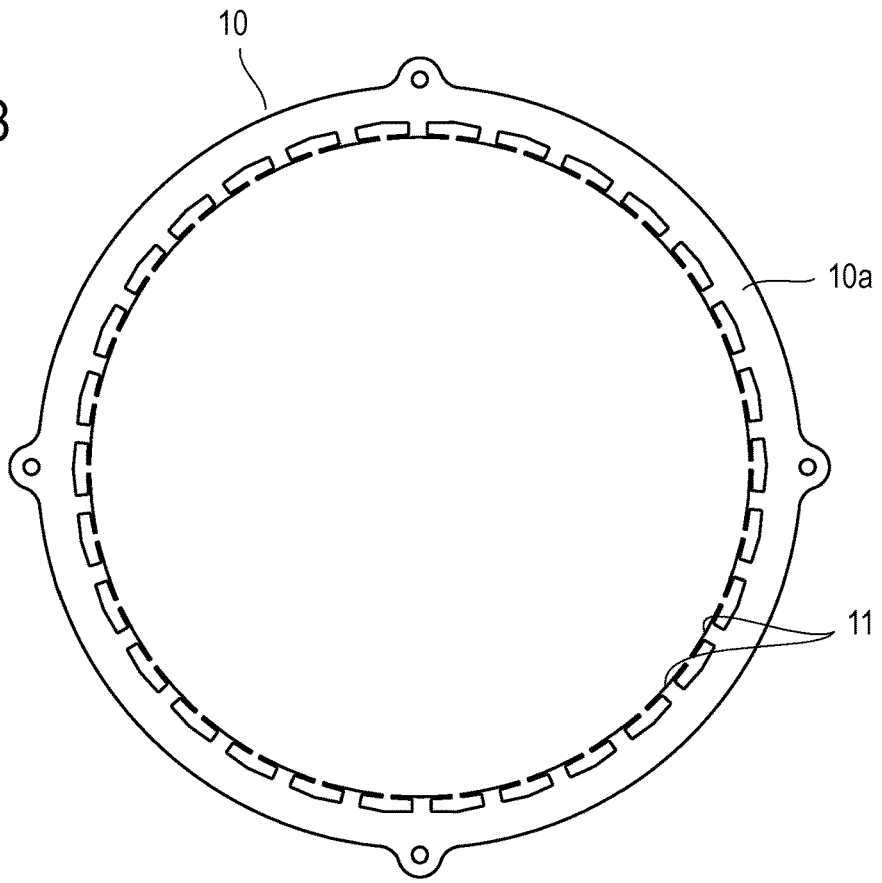
FIG. 5B is a plan view of the core shown in FIG. 5A.

FIGS. 2 to 4 show a stator of a resolver according to a first embodiment of the present invention, and a stator 100 comprises a core 10, an insulator 20, windings (hidden and not shown in FIGS. 2 to 4), seven first cover sections 40, a second cover section 50, and a harness 60. FIGS. 5A and 5B show details of the core 10, and FIGS. 6A, 6B, 7A to 7D and 8A to 8C show details of the insulator 20. FIGS. 9A to 9G show details of the first cover section 40, and FIGS. 10A to 10D show details of the second cover section 50. First, a configuration of each component will be described.

The core 10, which is made of a magnetic material, has an annular shape as shown in FIGS. 5A and 5B, and a plurality of teeth 11 is formed on the inner circumferential surface thereof at regular angular intervals in the circumferential direction. In this example, thirty teeth 11 are formed at intervals of 12°.

Figure 6B:
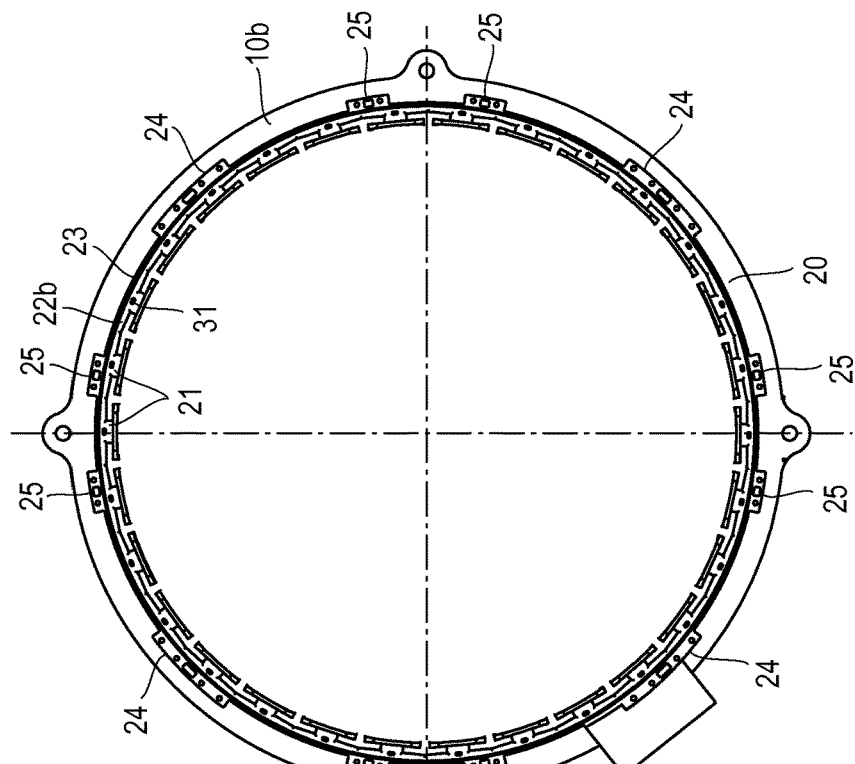
FIG. 6B is a bottom view of the core and the insulator integrated with each other shown in FIG. 6A.
Figure 6A:
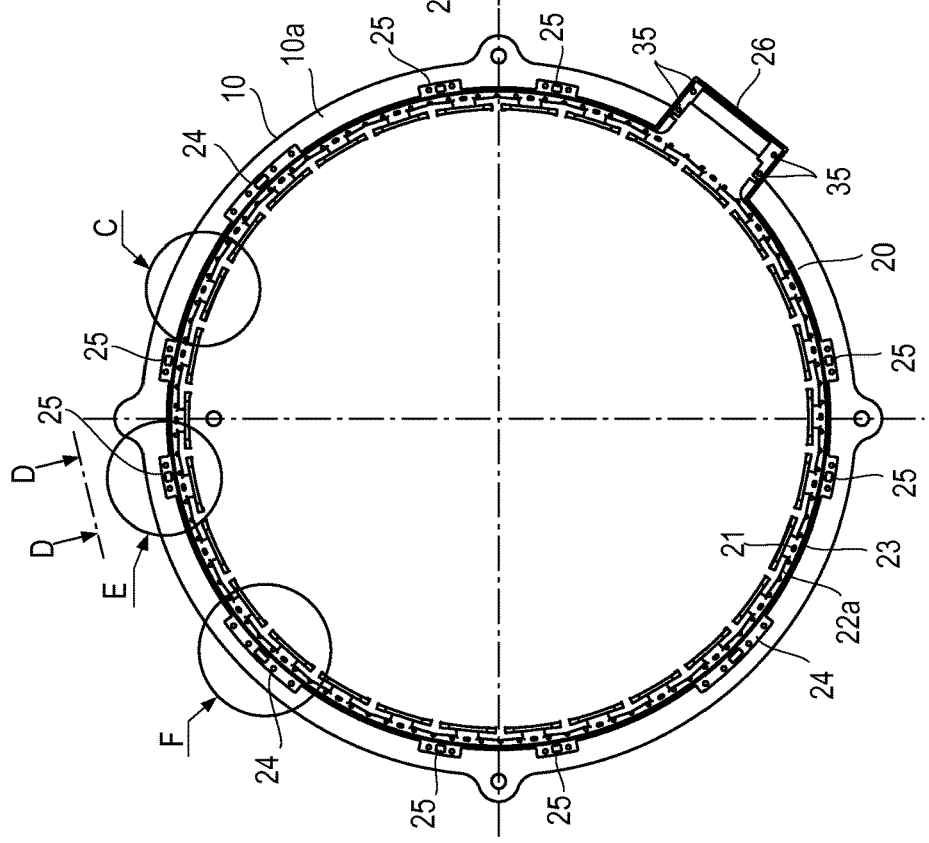
FIG. 6A is a plan view of the core and an insulator integrated with each other by insert molding.

The insulator 20 is integrated with the core 10 by insert molding. FIGS. 6A and 6B show the core 10 and the insulator 20 integrated with each other by insert molding, and FIGS. 7A to 7D and 8A to 8C show essential parts thereof in more detail.

As shown in FIGS. 6A and 6B, the insulator 20 has an annular shape and covers a part of the core 10. In this example, the insulator 20 is formed to cover both an inner part of a front surface and an inner part of a back surface of the core 10. The insulator 20 has winding parts 21, connecting wire parts 22a and 22b, barrier walls 23, island parts 24 and 25, and a harness attachment part 26. The insulator 20 may be made of nylon, for example.

Figure 7A:
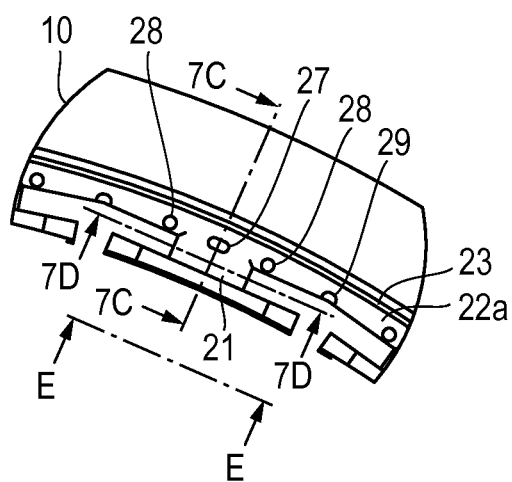
FIG. 7A is a partial enlarged view of a part C in FIG. 6A.
Figure 7C:
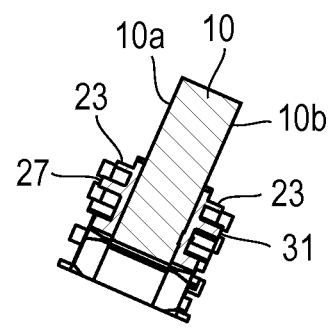
FIG. 7C is a cross-sectional view taken along the line 7C in FIG. 7A.
Figure 7B:
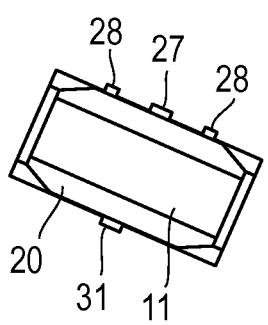
FIG. 7B is a view of the core and the insulator shown in FIG. 7A viewed from the direction of the arrows E.
Figure 7D:
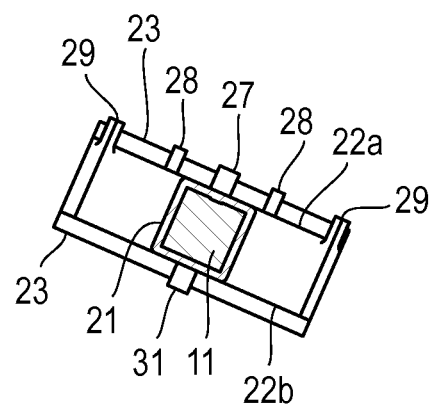
FIG. 7D is a cross-sectional view taken along the line 7D in FIG. 7A.

As shown in FIGS. 7A and 7D, each winding part 21 is provided to surround a tooth 11, and windings (an excitation winding and a detection winding) are wound around the winding part 21. The inner end surface of each tooth 11 (the tip end surface opposed to a rotor) is exposed.

The connecting wire parts 22a and 22b are provided next to the winding parts 21 on a front surface 10a and a back surface 10b of the core 10, respectively. The connecting wire parts 22a and 22b, each of which has an annular shape and is located on either outer side of each winding part 21, are provided to accommodate connecting wires that are extensions of the windings. Basically, one of the connecting wire parts (the connecting wire part 22a on the front surface 10a of the core 10, in this example) is used to accommodate the connecting wires.

As shown in FIG. 7A, a connecting boss 27 having an elongated cylindrical shape is formed on the connecting wire part 22a for each winding part 21 (each tooth 11), and two connecting bosses 28 having a cylindrical shape are further formed on the connecting wire part 22a on the opposite sides of the connecting boss 27 in the circumferential direction. Furthermore, a connecting boss 29 having a substantially semi-cylindrical shape is formed between adjacent winding parts 21. The connecting bosses 27 to 29 are used as a hook for the connecting wires or used for positioning of the connecting wires. In this example, as shown in FIG. 6B, a connecting boss 31 having an elongated cylindrical shape is also formed for each winding part 21 on the connecting wire part 22b on the side of the back surface 10b of the core 10.

The barrier walls 23 are provided on the outer circumferential surfaces of the connecting wire parts 22a and 22b (that is, on the sides opposite to the winding parts 21). The barrier walls 23 have a protruding streak-like shape and are formed to surround the connecting wire parts 22a and 22b. The barrier walls 23 have functions of preventing a varnish which is applied to the windings wound around the winding part 21 and with which the windings wound around the winding part 21 is impregnated from flowing to the outer circumferences and of protecting the connecting wires.

The island parts 24 and 25 are formed to protrude in the radial direction and are in contact with the core 10 on the outer side of the barrier walls 23 (on the sides opposite to the connecting wire parts 22a and 22b). The island parts 24 have a larger circumferential length than the island parts 25 and are formed at intervals of 90° in the circumferential direction. Although four island parts 24 are formed on the side of the back surface 10b of the core 10, only three island parts 24 are formed on the side of the front surface 10a of the core 10, and the harness attachment part 26 is formed at the position of the missing island part 24, as shown in FIG. 6A. Although details of the harness attachment part 26 are not shown in this example, the harness attachment part 26 is formed to protrude from the outer circumferential surface of the core 10 and to stride the core 10 to the back surface 10b of the core 10.

The island parts 25 are formed on the opposite sides of each island part 24 in the circumferential direction. Supposing that the insulator 20 is divided into four regions having a central angle of 90° as shown by the alternate long and short dash line in FIGS. 6A and 6B, there are one island part 24 and two island parts 25 on each of the front surface 10a and the back surface 10b of the core 10 in each region, except for the front surface 10a of the core 10 on which the harness attachment part 26 is formed. The one island part 24 is located at the middle of an arc of the region, and the two island parts 25 are located at the opposite ends of the arc of the region. The two island parts 25 are also formed at the opposite ends of the arc of the region in which the harness attachment part 26 is located on the front surface 10a of the core 10.

Figure 8A:
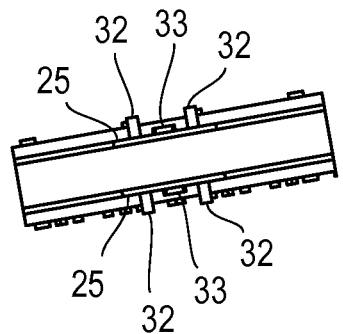
FIG. 8A is a view of the core and the insulator shown in FIG. 6A viewed from the direction of the arrows D.
Figure 8B:
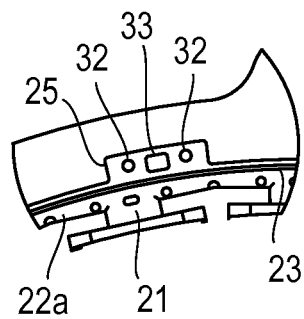
FIG. 8B is a partial enlarged view of a part E in FIG. 6A.

In this example, as shown in FIGS. 8A and 8B, each island part 25 has two caulking bosses 32 having a cylindrical shape, and a positioning projection part 33 is formed between the two caulking bosses 32. The positioning projection part 33 has a rectangular profile and has a smaller height than the caulking bosses 32.

Figure 8C:
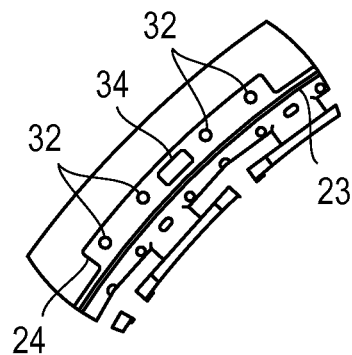
FIG. 8C is a partial enlarged view of a part F in FIG. 6A.

As shown in FIG. 8C, each island part 24 also has a positioning projection part 34, and two caulking bosses 32 are formed on each of the opposite sides of the positioning projection part 34 in the circumferential direction. The positioning projection part 34 has a wider rectangular profile than the positioning projection part 33 and has a height equal to the height of the positioning projection part 33. As shown in FIG. 6A, two caulking bosses 35 are formed at each of the opposite ends of the harness attachment part 26 in the width direction.

As shown in FIGS. 9A and 10A, the cover sections 40 and 50 each have the shape of an arc having a central angle of 90° and are made of resin. In this example, the cover sections 40 and 50 are made of nylon, as with the insulator 20.

As shown in FIGS. 9A to 9G, the cover section 40 comprises a top plate part 41 having the shape of an arc having a central angle of 90°, a side wall 42 provided along the outer circumference of the top plate part 41, and protrusion parts 43 and 44 formed on the outer circumferential surface of the side wall 42 so as to protrude in the radial direction. The protrusion part 43 is located at the middle in the circumferential direction of the cover section 40, and the protrusion parts 44 are located at the opposite ends of the cover section 40 in the circumferential direction. The protrusion parts 43 and 44 are formed with shapes corresponding to the shapes of and at positions corresponding to the positions of the island parts 24 and 25 in the region having a central angle of 90° of the insulator 20, respectively.

A positioning recess 45 is formed in the lower surface of the protrusion part 43, and two through-holes 46 are formed on each of the opposite sides of the positioning recess 45 in the circumferential direction. Similarly, a positioning recess 47 is formed in the lower surface of the protrusion part 44, and a through-hole 46 is formed on each of the opposite sides of the positioning recess 47 in the circumferential direction. The positioning recesses 45 and 47 are formed at positions corresponding to the positions of the positioning protrusion parts 34 and 33 of the insulator 20, and the holes 46 are formed at positions corresponding to the positions of the caulking bosses 32 of the insulator 20. As shown in FIG. 9G, a counterbore-like recess 48 is formed around each hole 46 in the upper surface of the protrusion parts 43 and 44.

The cover section 50 has the shape shown in FIGS. 10A to 10D. The cover section 50 comprises a top plate part 51 having the shape of an arc having a central angle of 90°, a side wall 52 provided along the outer circumference of the top plate part 51, protrusion parts 53 formed on the outer circumferential surface of the side wall 52 so as to protrude in the radial direction, and a harness cover part 54. The protrusion parts 53 are located at the opposite ends of the cover section 50 in the circumferential direction, and the harness cover part 54 is formed between the protrusion parts 43.

The protrusion parts 53 are formed with a shape corresponding to the shape of and at positions corresponding to the positions of the island parts 25 in the region having a central angle of 90° of the insulator 20 in which the harness attachment part 26 is formed, and have the same configuration as the protrusion parts 44 of the cover section 40. That is, a positioning recess 55, which is the same as the positioning recess 47 of the protrusion part 44 of the cover section 40, and two holes 57 provided with a recess 56, which are the same as the two holes 46 provided with the recess 48 of the protrusion part 44 of the cover section 40, are formed in the protrusion part 53.

The harness cover part 54 is formed at a position corresponding to the position of the harness attachment part 26 of the insulator 20 so as to protrude in the radial direction from the outer circumference of the top plate part 51, and is shaped to cover the harness attachment part 26. Two holes 58 are formed at each of the opposite ends in the width direction of the harness cover part 54 at positions corresponding to the positions of the caulking bosses 35 of the harness attachment part 26, and a recess 59 is formed around each hole 58 in the upper surface of the harness cover part 54. The hole 58 provided with the recess 59 have the same shape as the hole 57 provided with the recess 56 of the protrusion part 53.

As described above, in this example, the cover for the winding wound around each tooth 11 and the connecting wires that are extensions of the windings is not formed by a single piece but by the cover sections 40 and 50 arranged in the circumferential direction. The cover is divided into four sections in the circumferential direction, the cover on the side of the front surface 10a of the core 10 is formed by three cover sections 40 and one cover section 50, and the cover on the side of the back surface 10b of the core 10 is formed by four cover sections 40.

The cover sections 40 and 50 are attached by welding, and the cover sections 40 are fixed with the protrusion parts 43 and 44 positioned at the island parts 24 and 25 of the insulator 20. The cover section 50 is fixed with the protrusion parts 53 positioned at the island parts 25 of the insulator 20, and the harness cover part 54 is fixed to the harness attachment part 26 of the insulator 20.

Figure 11A:
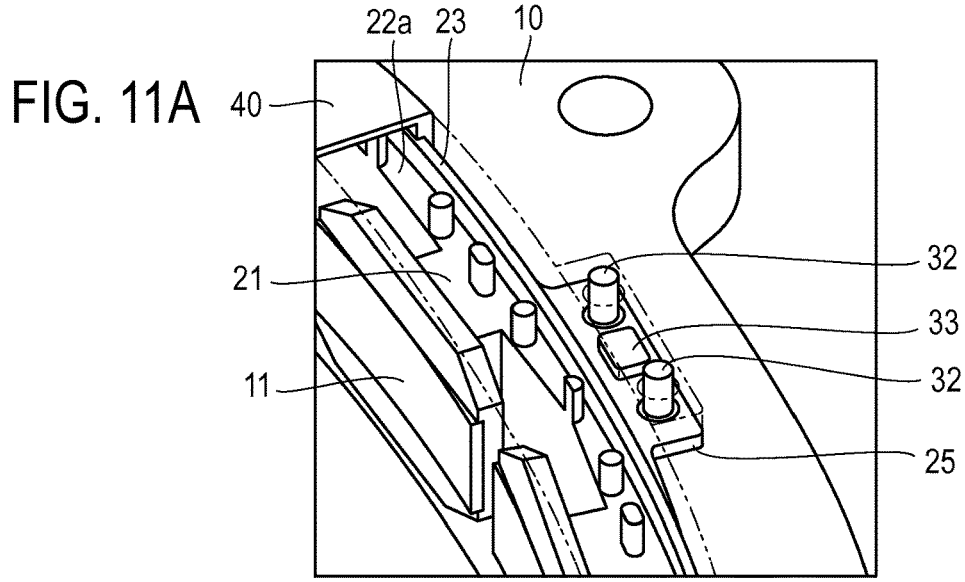
FIG. 11A is a diagram for illustrating attachment of the cover section of the stator shown in FIG. 2.
Figure 11B:
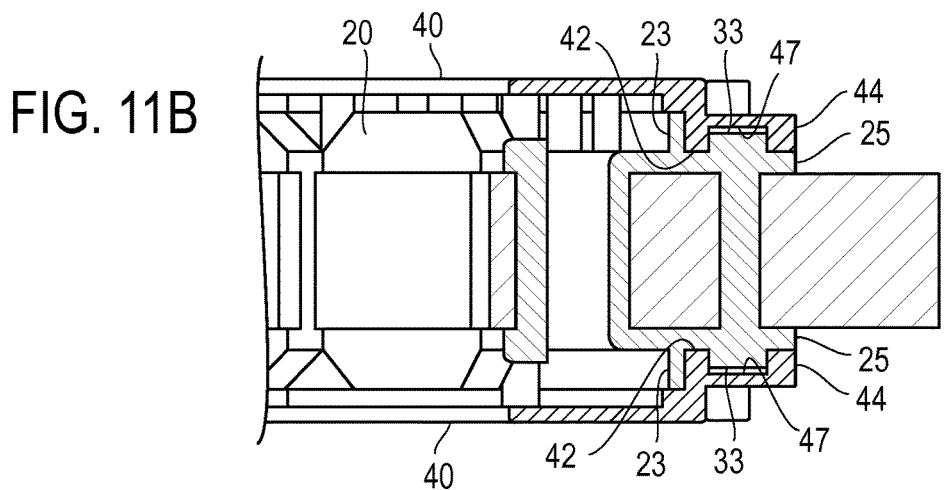
FIG. 11B is a diagram for illustrating attachment of the cover section of the stator shown in FIG. 2.
Figure 11C:
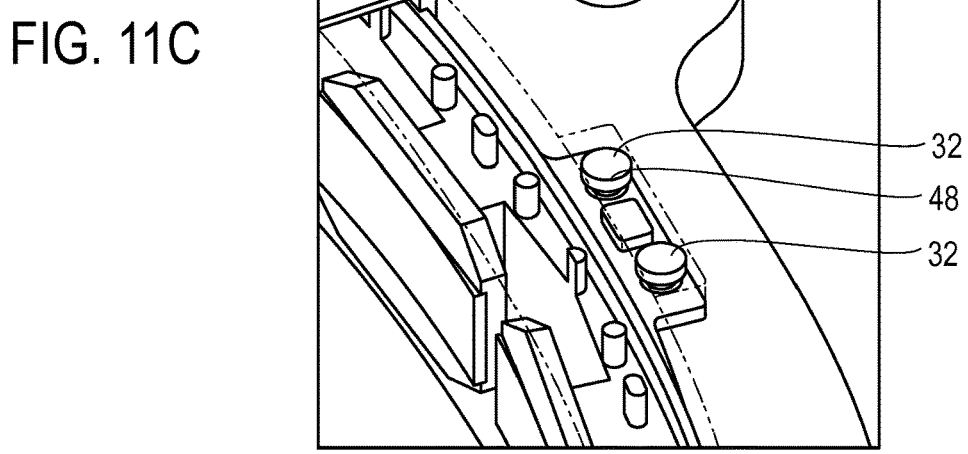
FIG. 11C is a diagram for illustrating attachment of the cover section of the stator shown in FIG. 2.

FIGS. 11A to 11C show how the protrusion part 44 of the cover section 40 is positioned and fixed at the island part 25 of the insulator 20. In FIGS. 11A to 11C, the windings and the connecting wires are not shown (the same holds true for FIGS. 13A and 13B described later).

As shown in FIGS. 11A and 11B, the positioning recess 47 formed in the protrusion part 44 is fitted onto and positioned at the positioning projection part 33 formed on the island part 25, and the two caulking bosses 32 formed on the island part 25 are inserted into the holes 46 of the protrusion part 44. In this process, as shown in FIG. 11B, the side wall 42 of the cover section 40 is interposed between the barrier wall 23 of the insulator 20 and the positioning projection part 33.

Fixing by welding is achieved by ultrasonic welding. An ultrasonic wave is applied to a tip end of the caulking boss 32 to make the tip end molten, and the molten material fills in the recess 48 formed around the hole 46 and hardens there as shown in FIG. 11C, thereby fixing the protrusion part 44 to the island part 25.

As with the protrusion part 44, the protrusion part 43 of the cover section 40 is positioned by fitting the positioning recess 45 onto the positioning projection part 34 formed on the island part 24 of the insulator 20, and is then fixed to the island part 24 by making the tip ends of the caulking bosses 32 of the island part 24 inserted in the four holes 46 molten by ultrasonic wave application and the molten material filling the recesses 48 around the holes 46 and hardening there. In this part also, the side wall 42 of the cover section 40 is interposed between the barrier wall 23 and the positioning protrusion part 34 of the insulator 20.

As described above, the cover section 40 is positioned at three points, the side wall 42 is interposed at three points between different parts of the insulator 20, and the cover section 40 is fixed by a total of eight caulking bosses 32. In this way, three cover sections 40 are attached on the side of the front surface 10a of the core 10, and four cover sections 40 are attached on the side of the back surface 10b of the core 10.

As with the protrusion part 44 of the cover section 40, the protrusion part 53 of the cover section 50 is positioned by fitting the positioning recess 55 onto the positioning projection part 33 of the insulator 20, and is then fixed to the island part 25 by making the tip ends of the caulking bosses 32 inserted in the two holes 57 molten by ultrasonic wave application and the molten material filling the recesses 56 formed around the holes 57 and hardening there. In this process, the side wall 52 is interposed between the barrier wall 23 of the insulator 20 and the positioning projection part 33.

The harness cover part 54 is fixed to the harness attachment part 26 by inserting the caulking bosses 35 of the harness attachment part 26 into the four holes 58, making the tip ends of the caulking bosses 35 molten by ultrasonic wave application, and the molten material filling the recesses 59 formed around the holes 58 and hardening there.

As described above, the cover section 50 is positioned at two points, the side wall 52 is interposed at two points between different parts of the insulator 20, and the cover section 50 is fixed by a total of eight caulking bosses 32 and 35.

As described above, the cover sections 40 and 50 are positioned by fitting the positioning recesses 45, 47 and 55 onto the positioning protrusion parts 34 and 33 of the insulator 20. To prevent occurrence of an internal stress or deformation during the fitting, the positioning recesses are fitted onto the positioning protrusion parts in such a manner that a slight gap is formed therebetween and the positioning protrusion parts are fitted into the positioning recesses to a modest depth. Therefore, the cover section 40, in particular, would fall down because of a force that occurs because of the shape of the cover section 40 when the cover section 40 is mounted on the insulator 20, if fitting the positioning recesses 45 and 47 onto the positioning projection parts 34 and 33 is the only means to prevent the cover section 40 from falling down. In this example, however, since the side wall 42 is interposed between different parts of the insulator 20, such falling down can be prevented. Therefore, when the cover section 40 is mounted on the insulator 20, the cover section 40 does not fall down (does not move) and is securely positioned, so that fixing by welding can be satisfactorily achieved without using any jig or the like. The cover section 50 is unlikely to fall down because of the shape thereof when the cover section 50 is mounted on the insulator 20.

As described above, in this example, the cover is not formed by a single annular piece but is formed by cover sections arranged in the circumferential direction. Therefore, even if the resolver is large, and a cover of a large diameter (a large cover) is required, the cover can have higher flatness and less warping and irregularities than a single-piece annular cover, and the yield is improved.

Since the yield is improved, and the cover has a sufficient flatness, the problem that attachment of the cover causes an internal stress in the stator can be avoided.

Since the cover is divided into sections, a problem would otherwise occur that the cover section is unstable and falls down when the cover section is mounted on the insulator, although an annular cover can be stably mounted on the insulator and can be immediately fixed by welding. However, such falling down is prevented by adopting the configuration described above.

In these respects, a stator having high productivity and performance can be provided even for a large resolver.

Next, a stator according to a second embodiment of the present invention will be described.

FIGS. 12A to 12D show a configuration of a cover section 40' according to the second embodiment. The cover section 40' differs from the cover section 40 according to the first embodiment in that the positioning recess 47 is omitted in the two protrusion parts 44. Although the positioning recess 45 is formed in the protrusion part 43.

Figure 13A:
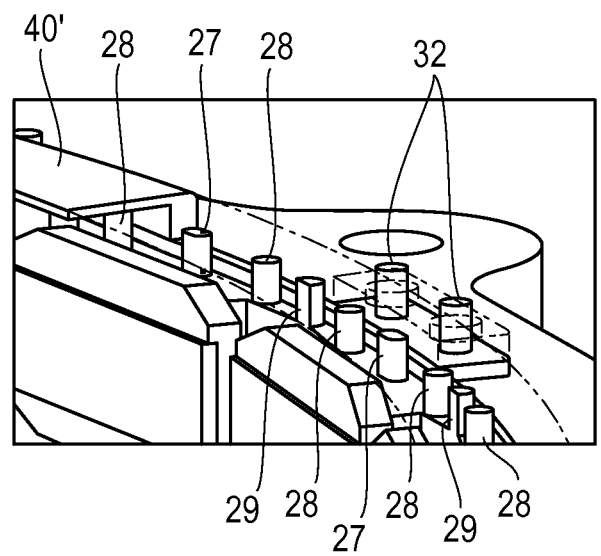
FIG. 13A is a diagram for illustrating attachment of the cover section of the stator according to the second embodiment of the present invention.
Figure 13B:
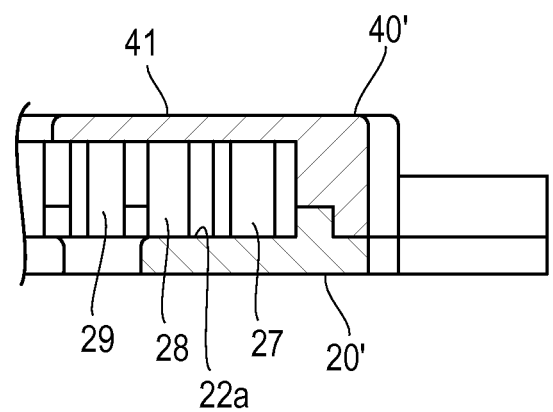
FIG. 13B is a diagram for illustrating attachment of the cover section of the stator according to the second embodiment of the present invention.

In this example, the cover section 40' mounted on an insulator 20' is not prevented from falling down by interposing the side wall 42 between different parts of an insulator 20' but using connecting bosses 27 to 29. FIGS. 13A and 13B show how this is achieved.

As shown in FIGS. 13A and 13B, when the cover section 40' is mounted on the insulator 20', the inner surface of the top plate part 41 of the cover section 40' located over the connecting wire part 22a of the insulator 20' is in contact with tip end surfaces of the connecting bosses 27 to 29. That is, in this example, the connecting bosses 27 to 29 support the cover section 40' and prevent the cover section 40' from falling down, and the connecting bosses 27 to 29 have a height with which the tip end surfaces of the connecting bosses 27 to 29 are in contact with the inner surface of the top plate part 41 of the cover section 40'.

Although not shown, a cover section corresponding to the cover section 50 according to the first embodiment that is attached in the region where the harness attachment part 26 of the insulator 20' is located also does not have the positioning recesses 55 in the two protrusion parts 53. The island part 25 of the insulator 20' does not have the positioning projection part 33.

As an arrangement to prevent the cover section from falling down, such an arrangement can also be used. As in the first embodiment, the cover section is fixed by welding of the caulking bosses 32 (35).

Figure 14A:
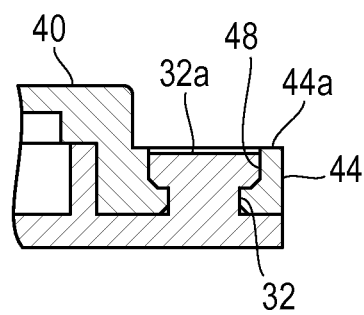
FIG. 14A is a cross-sectional view of a caulking boss 32 shown in FIG. 11C fixed by welding.

As shown in FIG. 14A, fixing by welding of the caulking bosses 32 (35) is achieved by making the tip ends of the caulking bosses 32 molten by ultrasonic wave application and the molten material filling the recesses 48 of the cover section 40 and hardening there. An upper surface 32a of the material filling the recess 48 is preferably at the same level as an upper surface 44a of the protrusion part 44 of the cover section 40 or slightly lower than the upper surface 44a as shown in FIG. 14A. Setting the upper surface 32a of the filling material at this level can minimize the possibility that an external force is exerted on the welded part.

Figure 14B:
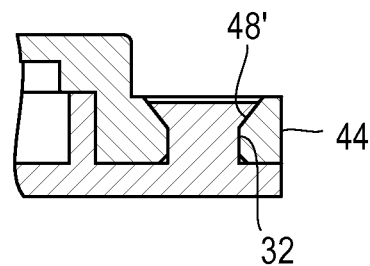
FIG. 14B is a cross-sectional view of the caulking boss fixed by welding in a case where a recess is a countersink.

FIG. 14B shows another example of the shape of the recess 48. In this example, a recess 48' having the shape of a countersink is shown. The recess may have this shape shown in FIG. 14B.

Figure 15A:
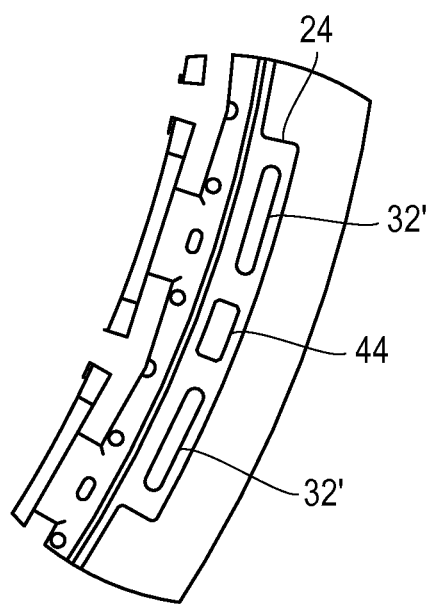
FIG. 15A is a diagram for illustrating an example of a caulking boss of another shape.
Figure 15B:
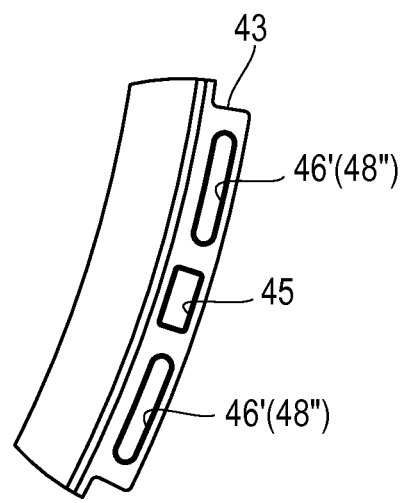
FIG. 15B is a diagram showing a hole in the cover section suitable for the caulking boss shown in FIG. 15A.

In the examples described above, the caulking bosses 32 (35) have a cylindrical shape. However, the present invention is not limited to this implementation, and the caulking bosses 32 (35) may have a prism-like shape. Alternatively, a caulking boss 32' having the shape of an elliptic cylinder shown in FIG. 15A is also possible. The caulking boss 32' has a larger cross sectional area and has a higher strength accordingly. FIG. 15B shows shapes of a hole 46' and a recess 48" suitable for the caulking boss 32' shown in FIG. 15A.

Next, a stator according to a third embodiment of the present invention will be described.

In this example, the caulking bosses of the insulator have the shape of an elliptic cylinder as with the caulking bosses 32' shown in FIG. 15A, and recesses having the shape of an elliptic cylinder suitable for the caulking bosses having the shape of an elliptic cylinder are formed at positions corresponding to the positions of the caulking bosses of the protrusion part and the harness cover part of the cover section.

Fixing of the protrusion parts and the harness cover part of the cover section to the island parts and the harness attachment part of the insulator is achieved by inserting the caulking bosses of the insulator into the recesses of the cover section and welding the caulking bosses to the recesses. The tip end surfaces of the caulking bosses and the bottom surfaces of the recesses are used as welding surfaces and the caulking bosses and the recesses are welded to each other at the welding surfaces. In this example, the height of the caulking boss is set to be lower than the height of the caulking boss 32' shown in FIG. 15A.

Next, a stator according to a fourth embodiment of the present invention will be described.

In this example, the cover section is not attached to the insulator by welding of the caulking bosses but by welding the positioning projection parts of the insulator to the positioning recesses of the cover section. FIGS. 16A to 16F show a configuration of a cover section 40" according to this fourth embodiment, and the protrusion parts 43 and 44 do not have the holes 46 and the recesses 48, and only positioning recesses 45' and 47' are formed.

As shown in FIGS. 16E and 16F, which show details of the positioning recess 45', the positioning recess 45' (47') has a plurality of sharp ridges 45b formed on a bottom surface 45a thereof. The bottom surface 45a and a top surface of the positioning projection part 34 of the insulator 20 are used as welding surfaces, and the positioning recess and the positioning projection part are welded to each other at the welding surfaces. In this case, the caulking bosses 32 of the insulator 20 are unnecessary.

In this way, the cover section can be attached to the insulator without using the caulking bosses 32.

Although various embodiments of the present invention have been described above, fixing by welding of the cover section can be achieved by heat welding or the like instead of the ultrasonic welding. However, the ultrasonic welding is superior to the heat welding or the like in that the high energy can eliminate the bonding interface to ensure secure integration.

Application of the ultrasonic wave occurs at the island parts and the harness attachment part of the insulator and therefore has less effect on the windings and the connecting wires. In the first embodiment, the tip end surfaces of the connecting bosses and the top plate part of the cover section can be spaced apart from each other, the ultrasonic vibration can be more effectively shielded.

Fixing by welding of the caulking bosses requires a small ultrasonic horn. Since the ultrasonic horn is small, an ultrasonic wave at high frequency can be used. In addition, the target of application of the ultrasonic wave is small, and the high frequency has an effect of limiting the range of vibration transmission. Therefore, the applied ultrasonic wave can be confined to a narrower range. This allows the connecting bosses to be used to support the cover sections and prevent the cover sections from falling down as described in the second embodiment.

In the example described above, the annular cover is divided into four regions in the circumferential direction and is formed by four cover sections. However, the number of regions into which the cover is divided in the circumferential direction is not limited to four. Furthermore, each cover section has only to have at least one protrusion part for welding. Depending on the application or usage, the cover sections on the side where no connecting wire is disposed can be omitted.

Figure 17:
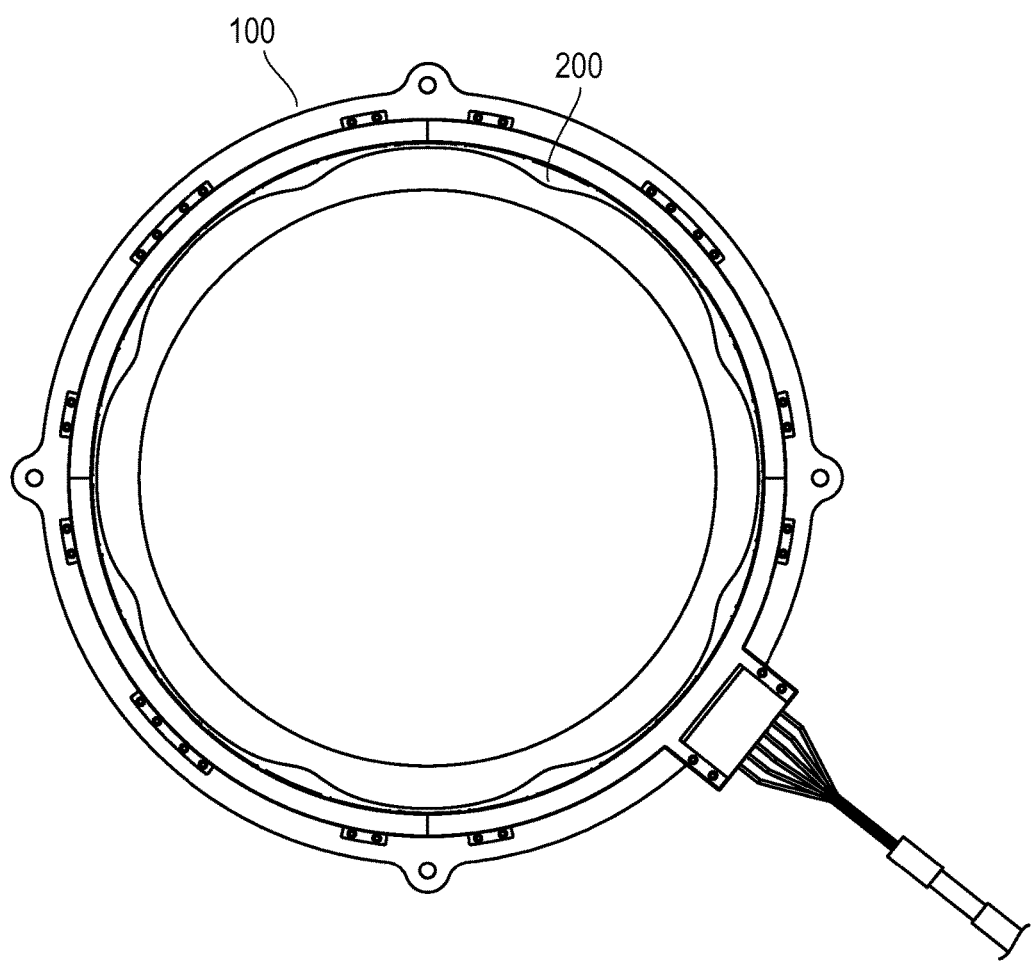
FIG. 17 is a plan view of a resolver comprising the stator shown in FIG. 2 and a rotor.

FIG. 17 shows a configuration of a resolver formed by the stator 100 according to the first embodiment shown in FIGS. 2 to 4 and a rotor 200 assembled into the stator 100. Illustration of a rotating shaft to which the rotor 200 is attached is omitted. The present invention can be applied not only to such a resolver in which the rotor 200 is disposed inside the stator 100 but also to a resolver in which teeth are formed on the outer circumferential surface of the core of the stator and the rotor is disposed outside the stator.

What is claimed is:

1. A stator of a resolver, comprising:
   a core having an annular shape and a plurality of teeth protruded from an inner circumferential surface or an outer circumferential surface of the core along a circumference thereof;
   an insulator that has an annular shape and covers a part of the core;
   windings wound around the teeth with the insulator interposed therebetween; and
   a cover that has an annular shape and covers the windings and connecting wires that are extensions of the windings,
   wherein the insulator comprises winding parts around each of which the windings are wound, a connecting wire part having an annular shape and on which the connecting wires are disposed, a barrier wall provided on a side of the connecting wire part opposite to the winding parts, a plurality of island parts formed along a circumference thereof on a side of the barrier wall opposite to the connecting wire part, and a positioning projection part being formed on each of the island parts,
   the cover being divided into a plurality of cover sections that are arranged along a circumferential direction so as to form the cover,
   each of the cover sections has a protrusion part that corresponds to one of the island parts, and the protrusion part is welded and fixed to the one of the island parts, and
   each of the cover sections is positioned with a positioning recess formed in the protrusion part being fitted onto the positioning projection part and a side wall thereof being interposed between the barrier wall and the positioning projection part.

2. The stator of a resolver according to claim 1, wherein a top surface of the positioning projection part and a bottom surface of the positioning recess are used as welding surfaces for the welding and fixing.

3. A stator of a resolver, comprising:
   a core having an annular shape and a plurality of teeth protruded from an inner circumferential surface or an outer circumferential surface of the core along a circumference thereof;
   an insulator that has an annular shape and covers a part of the core;
   windings wound around the teeth with the insulator interposed therebetween; and
   a cover that has an annular shape and covers the windings and connecting wires that are extensions of the windings,
   wherein the insulator comprises winding parts around each of which the windings are wound, a connecting wire part having an annular shape and on which the connecting wires are disposed, a plurality of island parts formed along a circumference thereof on a side of the connecting wire part opposite to the winding parts, and a connecting boss being formed on the connecting wire part at a position corresponding to each of the winding parts,
   the cover being divided into a plurality of cover sections that are arranged along a circumferential direction so as to form the cover,
   each of the cover sections has a protrusion part that corresponds to one of the island parts, and the protrusion part is welded and fixed to the one of the island parts, and
   a part of each of the cover sections located over the connecting wire part is in contact with a tip end surface of the connecting boss.

4. The stator of a resolver according to claim 1, wherein a caulking boss is formed on each of the island parts,
   a hole is formed in the protrusion part, and
   the welding and fixing is achieved by making a tip end of the caulking boss inserted in the hole molten and the molten material filling a recess formed around the hole and hardening there.

5. The stator of a resolver according to claim 1, wherein a caulking boss is formed on the each of island parts,
   a recess into which the caulking boss is to be inserted is formed in the protrusion part, and
   a tip end surface of the caulking boss and a bottom surface of the recess are used as welding surfaces for the welding and fixing.

6. The stator of a resolver according to claim 1, wherein the welding and fixing is achieved by ultrasonic welding.

7. A resolver that has the stator according to claim 1.

8. The stator of a resolver according to claim 3, wherein a caulking boss is formed on each of the island parts,
   a hole is formed in the protrusion part, and
   the welding and fixing is achieved by making a tip end of the caulking boss inserted in the hole molten and the molten material filling a recess formed around the hole and hardening there.

9. The stator of a resolver according to claim 3, wherein a caulking boss is formed on the each of island parts,
   a recess into which the caulking boss is to be inserted is formed in the protrusion part, and
   a tip end surface of the caulking boss and a bottom surface of the recess are used as welding surfaces for the welding and fixing.

10. The stator of a resolver according to claim 2, wherein the welding and fixing is achieved by ultrasonic welding.

11. The stator of a resolver according to claim 3, wherein the welding and fixing is achieved by ultrasonic welding.

12. The stator of a resolver according to claim 4, wherein the welding and fixing is achieved by ultrasonic welding.

13. The stator of a resolver according to claim 5, wherein the welding and fixing is achieved by ultrasonic welding.

14. The stator of a resolver according to claim 8, wherein the welding and fixing is achieved by ultrasonic welding.

15. The stator of a resolver according to claim 9, wherein the welding and fixing is achieved by ultrasonic welding.

16. A resolver that has the stator according to any one of claims 2, 4-6, 10, 12 and 13.

17. A resolver that has the stator according to any one of claims 3, 8, 9, 11, 14 and 15.

* * * * *